Jan. 12, 1954

T. SLONCZEWSKI 2,666,100

MEASURING APPARATUS

Filed Oct. 20, 1951

INVENTOR
T. SLONCZEWSKI
BY
Franklin Mohr
ATTORNEY

Jan. 12, 1954   T. SLONCZEWSKI   2,666,100
MEASURING APPARATUS
Filed Oct. 20, 1951   5 Sheets-Sheet 2

INVENTOR
T. SLONCZEWSKI
BY
Franklin Mohr
ATTORNEY

Jan. 12, 1954

T. SLONCZEWSKI 2,666,100

MEASURING APPARATUS

Filed Oct. 20, 1951

INVENTOR
T. SLONCZEWSKI
BY
Franklin Mohr
ATTORNEY

Jan. 12, 1954

T. SLONCZEWSKI 2,666,100

MEASURING APPARATUS

Filed Oct. 20, 1951

INVENTOR
T. SLONCZEWSKI
BY Franklin Mohr
ATTORNEY

Jan. 12, 1954

T. SLONCZEWSKI 2,666,100

MEASURING APPARATUS

Filed Oct. 20, 1951

INVENTOR
T. SLONCZEWSKI
BY
Franklin Mohr
ATTORNEY

Patented Jan. 12, 1954

2,666,100

UNITED STATES PATENT OFFICE 2,666,100

MEASURING APPARATUS

Thaddeus Slonczewski, Summit, N. J., assignor to Bell Telephone Laboratories, Incorporated, New York, N. Y., a corporation of New York Application October 20, 1951, Serial No. 252,390

8 Claims. (Cl. 179—175.3)

1

This invention relates to measuring sets and more particularly to sets for measuring insertion loss or gain in transmission systems.

As example of a situation in which the invention would be useful would be a very long transmission system, say a four-thousand mile coaxial line carrier current transmission system, in which there were to be one thousand line sections, each comprising four miles of coaxial cable and a repeater. If the entire system were to be equalized for uniform transmission over a wide frequency range to within a tolerance of ±1 decibel, it would be required that the average equalization per section be maintained within ±.001 decibel. From this requirement there would result a demand for a measuring set capable of detecting and measuring any systematic deviation in the equalization with an accuracy of .001 decibel.

Under typical conditions, the usual transmission loss in a four-mile section of coaxial cable will be as great as 40 decibels. To measure a transmission loss or gain of 40 decibels with an accuracy of .001 decibel requires the use of standardized attenuators with component resistors having a long-time stability of resistance value of one part in 10,000. To cover a suitable frequency range such resistors must at the same time be free from frequency effects up to eight megacycles or more.

However, when the cable loss in a line section is offset by the repeater gain to within .05 decibel, the requirements placed upon the components of a standard attenuator are reduced to a long-time stability of two parts in a hundred.

An object of the invention is to improve the accuracy of measurements of insertion loss or gain in transmission systems.

A particular object is to reduce the adverse effect upon the accuracy of the measurements that is due to the drifting of the operating constants of the usual vacuum tubes and other circuit components during the interval in which the measuring circuit is being switched between the two circuit configurations that are to be compared and the necessary comparisons are being made.

Figure 1:
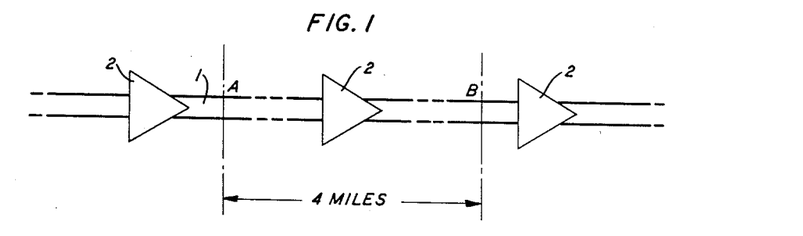
Fig. 1 is a schematic diagram of a transmission line with repeaters at intervals.

Referring to Fig. 1, there is shown schematically a continuous transmission line section 1 illustrated as consisting of a number of four-mile sections of coaxial cable joined by repeaters 2. In accordance with the present invention, there is provided a measuring set capable of measuring the insertion loss of any section such as AB, four miles long or of any desired length, and containing a repeater.

Figure 2:
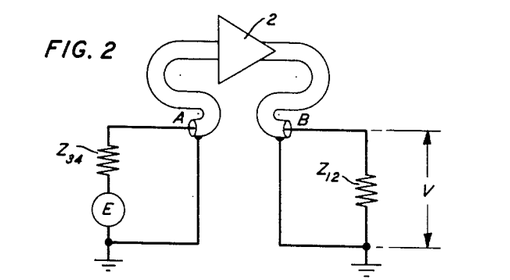
Fig. 2 is a schematic diagram of a measuring circuit for measuring the insertion loss of a section of coaxial cable including a repeater.

Referring to Fig. 2, let V be the repeater section output voltage when the section AB is connected between a generator of voltage E with impedance $Z_{34}$ and a load circuit of impedance $Z_{12}$, the impedances $Z_{34}$ and $Z_{12}$ matching the repeater section output and input impedances at B and A, respectively, and so simulating an uninterrupted line of infinite extent. Remembering that the repeater is unidirectional, we have $$V = \frac{EZ_{1234}}{Z_{34}+Z_{12}} \cdot \frac{Z_{12}}{Z_{12}+Z_{34}} \quad (1)$$

where $Z_{1234}$ is the transfer impedance between terminals 12 and 34.

Figures 3, 4, 10:
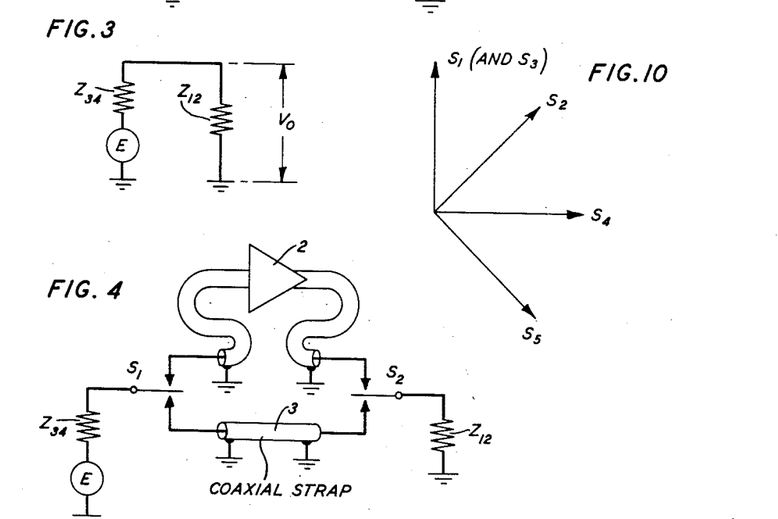
Fig. 3 is a schematic diagram of the reference state of the circuit of Fig. 2 when a strap connection is substituted for the coaxial cable and repeater.
Fig. 4 is a schematic diagram of a switching system for alternately establishing the circuit conditions of Figs. 2 and 3, respectively.
Fig. 10 is a vector diagram related to a phasing device shown in Figs. 7 and 8.

When the generator is connected to the load directly without the repeater section, as shown in Fig. 3, the voltage across the load is $$V_0 = \frac{EZ_{12}}{Z_{34}+Z_{12}} \quad (2)$$

The insertion loss L (in decibels) is defined by the voltage ratio $$10^{\frac{L}{20}} = \frac{V_0}{V} = \frac{Z_{12}+Z_{34}}{Z_{1234}} \quad (3)$$

$$L = 20 \log_{10} \frac{Z_{12} + Z_{34}}{Z_{1234}} \qquad (4)$$

The basic measuring circuit employed in practicing the invention is that shown in Fig. 4. It provides for comparing the voltages $V_0$ and $V$ by switching the generator and detector between the repeater section and a short strap 3 composed of cable like that in the repeater section. The switches are designated $S_1$ and $S_2$. The cable illustrated is coaxial.

While, in the case described above, the difference between $V_0$ and $V$ need not be known to an accuracy better than 2 per cent, the value of either $V_0$ or $V$ should not change by more than one part in 10,000 in the time it takes to effect a measurement. The constants of ordinary vacuum tube circuits are known to drift more than this amount in one second. The effect of such a drift may be reduced to a negligible amount by employing a high repetition rate in the switches required for making the voltage comparison. At a repetition rate of 60 cycles per second, the drift is found to be less than one part in fifty thousand. Magnetically operated mercury switches such as are described in the copending application of J. T. L. Brown and C. E. Pollard, Jr., Serial No. 119,596, filed October 5, 1949, are found to be well suited to the purpose.

In deriving the Equations 3 and 4 it was tacitly assumed that the generator and detector impedances match the repeater section impedances exactly. For a more rigorous analysis it is necessary to calculate the effect of mismatches by replacing $Z_{12}$ by $(Z_{12} + \Delta Z_{12})$ and $Z_{34}$ by $(Z_{34} + \Delta Z_{34})$. When this is done the following results are obtained:

$$V = \frac{EZ_{1234}}{Z_{34} + \Delta Z_{34} + Z_{12}} \cdot \frac{Z_{12} + \Delta Z_{12}}{Z_{12} + \Delta Z_{12} + Z_{34}} \qquad (5)$$

$$V_0 = \frac{E(Z_{12} + \Delta Z_{12})}{Z_{24} + \Delta Z_{34} + Z_{12} + \Delta Z_{12}} \qquad (6)$$

where $\Delta Z_{12}$ and $\Delta Z_{34}$ are the variations of the respective impedances from their matching values. Then, with permissible approximations, $$\frac{V_0}{V} = \frac{Z_{12} + Z_{34}}{Z_{1234}} \left(1 + \frac{\Delta Z_{12} \cdot \Delta Z_{24}}{(Z_{12} + Z_{34})^2}\right) \qquad (7)$$

The first fraction on the right-hand side of Equation 7 represents the voltage ratio that it is desired to measure. The expression in parentheses represents the error of measurement that is due to impedance mismatch. In order to reduce the effect of the impedance of the repeater on $Z_{12}$ and $Z_{34}$ as much as possible, the four-mile coaxial cable is divided into 2 two-mile lengths, one on each side of the repeater, as nearly as may be practicable. The impedances $Z_{12}$ and $Z_{34}$ are then essentially the impedances of the coaxial conductor which in a common case is 75 ohms resistance. Assuming $\Delta Z_{12}$ and $\Delta Z_{34}$ are both equal and may be designated by $\Delta Z$ and assuming that the product of $\Delta Z_{12}$ and $\Delta Z_{34}$ is a real number, then to obtain measurements with an accuracy of $\pm .001$ decibel, $\Delta Z$ must be no greater than 1.5 ohms. To match the cable impedance at the input and output, networks may be designed by well-known methods and embodied in well-known manner in the measuring set. In addition to such networks, attenuators may be inserted also in well-known manner in order to reduce the effect of residual impedance mismatches not eliminated by the networks.

Figure 5:
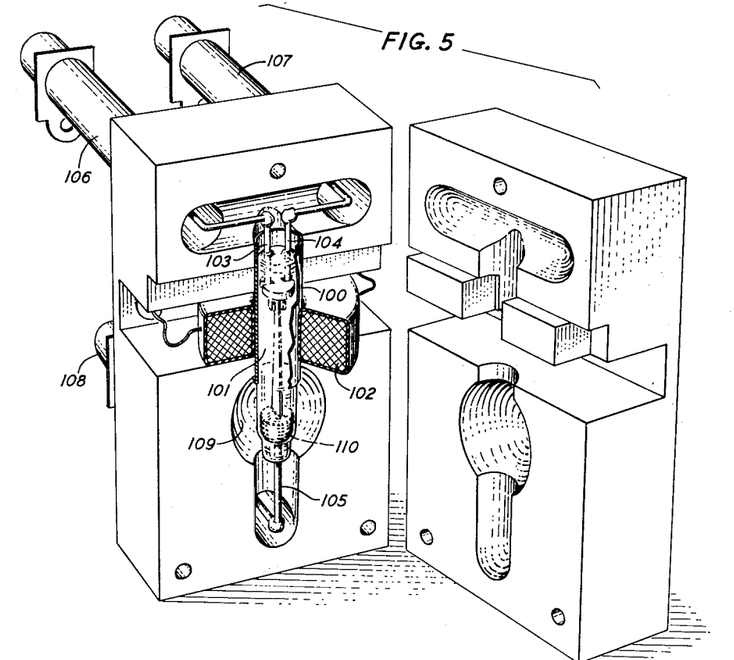
Fig. 5 is a perspective view of a magnetically operated mercury switch adapted for use in the system of Fig. 4.
Figure 6:
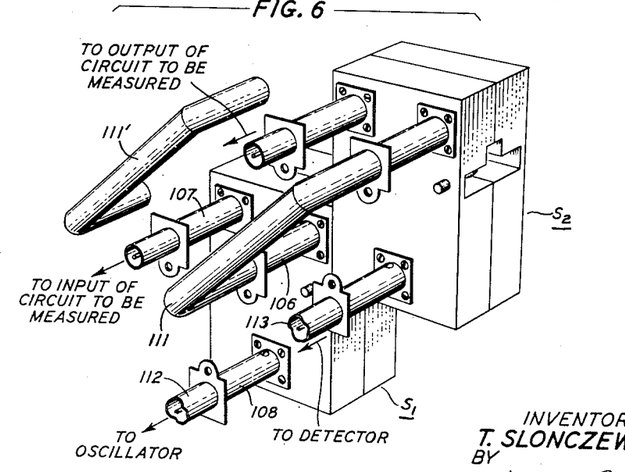
Fig. 6 is a schematic representation of two switches of the type shown in Fig. 5, connected together by a coaxial strap and connected to the ends of a length of coaxial cable.

In addition to being fast acting, a switch for use in making a voltage comparison as shown in Fig. 4 must also be a good transmission element. Fig. 5 shows a switch of the type disclosed in the above cited Brown and Pollard application inclosed in a cylindrical conductive shield 100 separating the switch proper 101 from the driving winding 102 to reduce unwanted coupling between the two, while permitting normal operation of the switch by the magnetic field of the operating winding. The leads 103, 104 and 105 from the switch are brought out to coaxial jacks 106, 107 and 108, respectively, in cylindrical cavities as shown in the figure. The diameters of the cavities are proportioned to duplicate the impedance of the cable, for example 75 ohms. A bulging out of the cavity is introduced at the point 109 where the mercury pool 110 in the switch increases the diameter of the inner conductor. The complete coaxial relay, two of which are shown in Fig. 6, includes the three jacks into which the circuit to be measured and the coaxial strap can be plugged. These switches are suitable for use as the switches designated $S_1$ and $S_2$ in the schematic diagram of Fig. 7. The net effect of properly distributing the capacitances of the relay is that it interposes a negligible impedance irregularity at all frequencies up to 20 megacycles or more. The switch introduces into the circuit a transmission loss rising from about 0.01 decibel at 1 megacycle to about 0.02 decibel at 10 megacycles, which rise is believed to be due primarily to resistance in the leads. These leads are advantageously made of Permalloy, and all parts not enclosed in the glass container of the relay should be gold plated to reduce the resistance. It is found that with proper precaution the insertion losses for the two positions of the switch can be made to differ from each other by less than .0002 decibel.

The gap at the open contact of the switch is bridged by a direct capacitance of .3 micromicrofarad. When the oscillator is connected to the detector through the coaxial strap, each of the two direct capacitances is shunted by the cable impedance of 75 ohms and the two ends of the looped cable section are coupled to the oscillator and detector, respectively, so weakly through the bridging capacitance that no error of measurement results. When the switch is on the repeater side, the coupling caused by the two capacitances in series would cause a voltage to appear across the detector which could not be tolerated within the desired limits of accuracy of the measuring set. It is mainly for this reason that the short length of coaxial cable strap, shown in a convenient form at 111 in Fig. 6, is employed to separate the two switches. A cable length of one foot has been found satisfactory for this purpose. The capacitance of the strap 111, about 13 micromicrofarads, breaks up the oscillator-detector loop into two loops. The resulting attenuation of the capacitive coupling effect brings the error of measurement down to a tolerable value.

The coaxial cable strap 111 is fashioned into a rigid form, illustrated in Fig. 6 as three sides of a rectangle and is terminated with coaxial plugs at the open ends. The switches are mounted in such a way that for purposes of calibration while the coaxial cable strap 111 is plugged into one side of the circuit a duplicate strap 111' may be plugged into the other side in place of the circuit to be measured. Experiment has shown that the unbalance between the two paths may be made less than .0002 decibel. This is to be compared with the best results obtainable with available flexible coaxial conductors, which have attenuations as high as a few hundredths of a decibel and also contribute impedance irregularities to the system. Therefore, it is advisable that the repeater section input and output be brought to the measuring set by using the ends of the coaxial cable itself terminated in coaxial plugs, 112 and 113 as shown in Fig. 6. In making calculations with respect to the measurements, the length of the strap, one foot in the example given, must be subtracted from the length of the coaxial cable in the circuit to be measured to account for the length of coaxial cable separating the switches.

Figure 7:
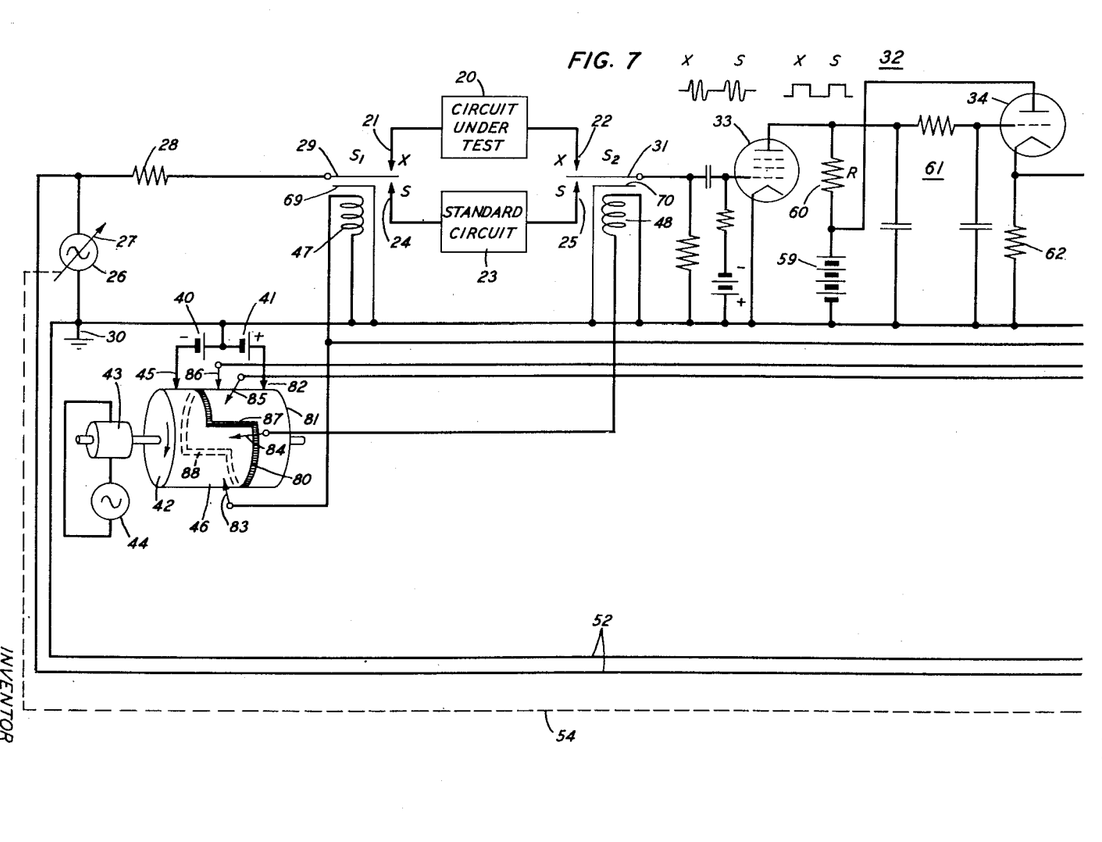
Figs. 7 and 8 taken together form a schematic circuit diagram of a more complete embodiment of a measuring set in accordance with the invention.
Figure 8:
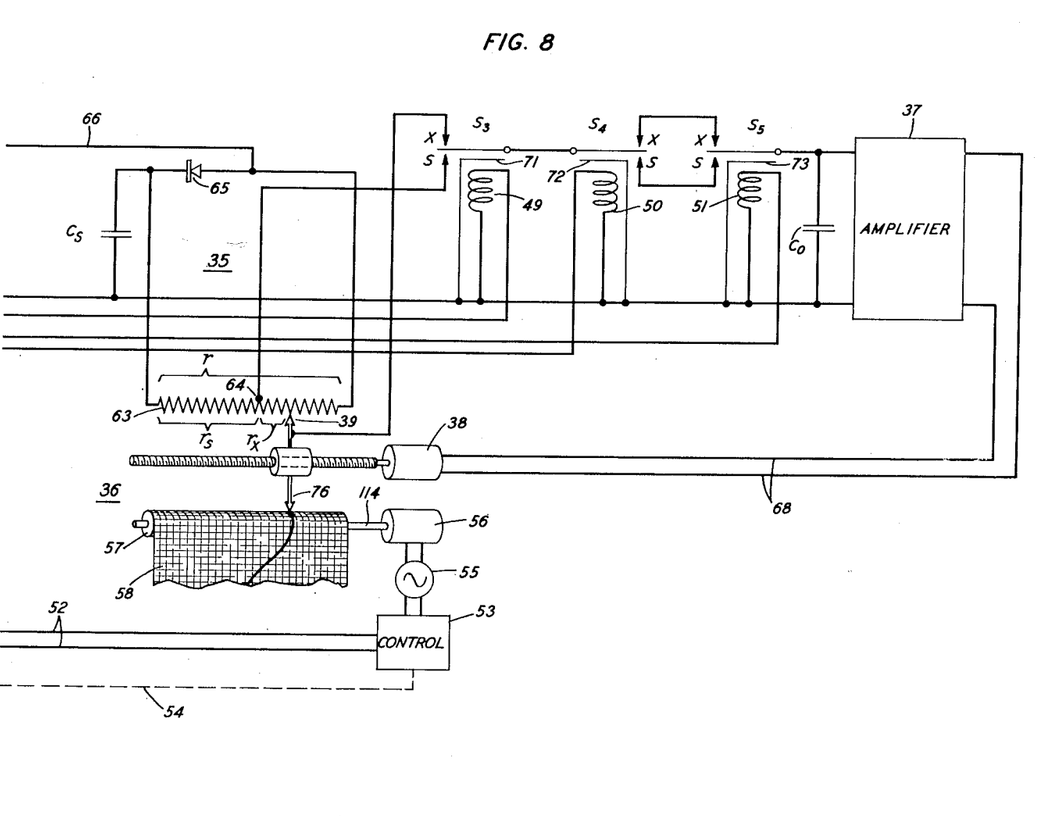

An illustrative measuring system employing the invention is shown in detail schematically in Figs. 7 and 8, wherein a circuit 20 under test has an input terminal connected to the upper contact 21 of the switch $S_1$ and an output terminal connected to the upper contact 22 of the switch $S_2$. A standard circuit 23, which may be the strap 111, has an input terminal connected to the lower contact 24 of the switch $S_1$ and an output terminal connected to the lower contact 25 of the switch $S_2$. Power for testing is supplied by a suitable generator 26 which has a means of frequency variation indicated schematically by the arrow 27 which means may be of a mechanical nature or may be electrical or of any suitable kind. The impedance of the generator is represented schematically by a resistance 28, the generator with its impedance being connected between the movable contactor 29 of the switch $S_1$ and ground 30.

The movable contactor 31 of the switch $S_2$ is connected to a converter 32 comprising a detector tube 33, advantageously a pentode operated upon the curved portion of the anode characteristic, and a cathode follower tube 34, each with appropriate associated circuits.

The output of the converter feeds into a potentiometer arrangement 35 that is mechanically coupled to a recorder 36.

Additional switches $S_3$, $S_4$ and $S_5$, referred to hereinafter as blanking switches, serve to connect the potentiometer electrically with a sampling condenser $C_0$ which is in turn connected across the input terminals of an amplifier 37. The output of this amplifier is connected through leads 68 to a reversible motor 38 which drives the recording member 76 of the recorder and the movable contactor 39 of the potentiometer.

The switches $S_1$ through $S_5$ have operating windings 47 through 51 which are actuated by power from a convenient source such as batteries 40 and 41 passing through a commutator 42 which may be driven in any suitable manner as by a motor 43 actuated by a low frequency, e. g., 60 cycle, source 44.

A pair of unlike terminals shown as the positive terminal of the battery 40 and the negative terminal of the battery 41 are both grounded as shown. The negative terminal of the battery 40 is connected to a brush 45 bearing continually upon the conductive segment 46 of the commutator. An insulating separator 80 divides the commutator into the two conductive segments 46 and 81, the latter being continually in contact with a brush 82 which is connected to the positive terminal of the battery 41. A plurality of brushes 83, 84, 85 and 86 bear upon the commutator in the region thereof which is crossed by the portions 87 and 88 of the separator 80 which portions extend horizontally in the figure. The brushes 83 through 86 are arranged as in a vertical plane with angular separations between them, which may conveniently be uniform separations of 45 degrees. The brush 83 is connected to the operating windings 47 and 49; the brush 84 to the winding 48; the brush 85 to the winding 50; and the brush 86 to the winding 51. The opposite ends of the operating windings 47 through 51 are connected to ground.

The test power generator 26 has an additional electrical connection through leads 52 with a control device 53, which latter may have both electrical and mechanical output and is coupled by linkage schematically indicated by the dashed line 54 with the frequency varying element 27. The linkage 54 may be mechanical or electrical or otherwise as required. The control device 53, with the aid of an auxiliary power source 55 and a motor 56, which latter is coupled mechanically to the shaft 115, controls the movement of a roller 57 over which passes a ruled paper chart 58 upon which the record is made.

In the converter 32, a battery 59 serves as a source of anode current supply for the tubes 33 and 34, the anode of the tube 33 being connected to the battery through an anode load resistor 60, also designated as R. A resistance-capacitance filter 61 is connected between the anode circuit of the tube 33 and the grid circuit of the tube 34 to absorb transient disturbances. The cathode of the tube 34 is connected to ground through the cathode follower load resistor 62.

In the potentiometer arrangement 35 the slide wire 63 has a fixed contactor 64 connected thereto in addition to the movable contactor 39. A unidirectionally conductive element 65 is connected across the terminals of the slide wire 63 with its conductive direction from the cathode of tube 34 toward ground. The left-hand end of the slide wire as shown in the figure is connected to ground through a condenser $C_s$ and the right-hand end is connected through a lead 66 to the cathode of the tube 34, the conductive direction of the element 65 being from the cathode of tube 34 toward ground.

Grounded shields 69 through 73 as shown are advantageous to shield the relay contacts from having currents induced in them from the respective operating windings, and such shields may be provided as illustrated by the shield 100 in Fig. 5.

In the operation of the system of Figs. 7 and 8, the oscillator 26 is connected to converter 32 for alternate time intervals through the circuit 20 under test and the standard circuit 23, respectively, by the action of switches $S_1$ and $S_2$. Alternate pulses of rectified current from the converter 32 are impressed upon the potentiometer arrangement 35 by the effect of the same switching action.

The upper plate of the condenser $C_s$ is maintained at a nearly constant potential to ground, any losses being quickly replenished by current flowing through the unidirectional conductor 65 from the cathode circuit of the tube 34. Between pulses the two ends of the slide wire 63 are at substantially the same potential since there is very little potential difference across the unidirectional conductor 65. During a pulse, the grid potential of the tube 34 is depressed, in turn diminishing the potential difference across the cathode follower load resistor 62, whereupon a potential difference appears across the slide wire 63. This latter potential difference is due to the fact that the left-hand end of the slide wire stays at substantially the same potential as the ungrounded side of the condenser $C_s$ while the right-hand end of the slide wire follows the potential of the cathode of the tube 34. As the amplitudes of successive pulses may vary, the potential difference across the slide wire varies and with it the potentials of the contacts 39 and 64.

The potentiometer's fixed contact 64, connected to the lower contact S of the relay S₃ supplies to the latter contact the potential of the fixed contact 64, and similarly the movable contact 39 connected to the upper contact X of relay S₃ supplies the potential of the movable contact 39. Throughout the circuits of Figs. 7 and 8 the designations S and X are applied to indicate conductors and contacts used when the standard 23 is energized and when the circuit 20 under test is energized, respectively.

The switches S₃, S₄ and S₅ cooperate to supply sample voltages to the condenser C₀ from the relay contacts S and X alternately. Any variation of successive samples upon C₀ produces in effect a low frequency (e. g. 60 cycles) alternating voltage, which is impressed upon the amplifier 37 and in amplified form this voltage operates the motor 38 through the leads 68 to reduce the amplitude of the alternating voltage by moving the contact 39 in the proper direction and by the proper amount, as is well known in the art of automatic balancing mechanisms and recorders.

The sequence of operation of the switches S₁ through S₅ is determined by the commutator 42 which reverses the polarity of the current in the respective operating windings at the proper instants of time. When any one of the brushes 83 through 86 passes over the portion 87 of the separator with the commutator revolving in the direction indicated by the arrow in the figure, the polarity of the brush changes from positive to negative causing one or more connected switches to shift from one contact to the other. When a brush passes over the portion 88, its polarity changes from negative to positive and the switches shift back to the original contact. As shown, the resulting order of operation of the switches is: S₁ and S₃ together, S₂, S₄, S₅, as indicated in vector diagram in Fig. 10.

Figure 9:
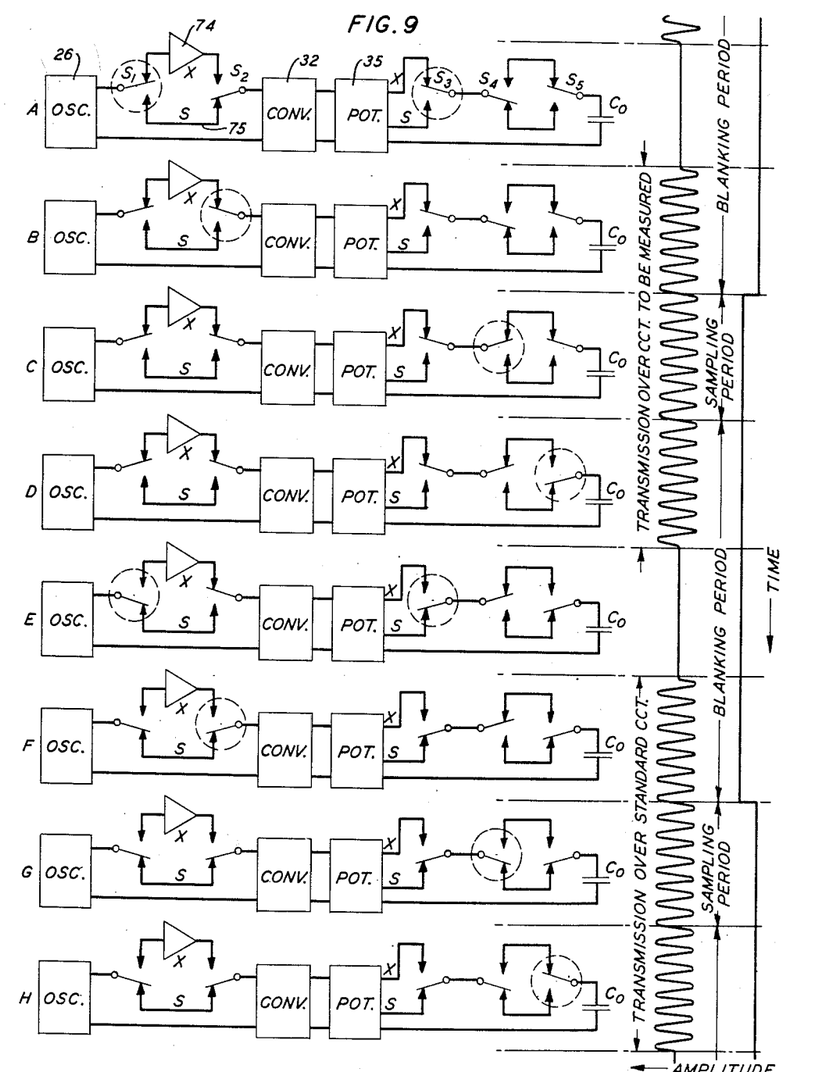
Fig. 9 is a set of related diagrams useful in explaining the operation of the measuring set of Figs. 7 and 8.

The detector circuit advantageously uses a plate curvature pentode detector. Its function and those of the blanking relays may be understood more readily by considering the sequence of switching operations as shown in Fig. 9. In this figure the active relays are circled in broken lines.

At A, oscillator 26 is connected to a repeater 74 to be measured through S₁ which has just shifted to its upper contact.

The repeater however is not yet connected to the converter 32. With no input voltage present, the only current flowing in the detector tube 33 is the space current $i_0$. This current impresses upon the cathode follower 34 a voltage $E_c - Ri_0$ across the smoothing condenser $C_s$. The condenser C₀ for sampling the output voltage is at this time disconnected from the circuit.

At B, the switch S₂ has connected the repeater path, X, into the circuit, placing a voltage AV at the detector input. The voltage at the cathode follower is now $$E_b - i_0R - \frac{1}{4}\frac{\Delta g}{\Delta e}A^2V^2R \quad (8)$$

where $$\frac{\Delta g}{\Delta e}$$

is the conductance slope of the pentode and A is a multiplier representing the frequency characteristic of the connecting circuit. Any transient effect caused by the switching on of the voltage is dissipated in the filter 61 without affecting the voltage at the sampling condenser C₀ which is still disconnected.

At C, the blanking relay S₄ has completed the connection of the condenser C₀ to the movable contact 64 of the slide wire r (conductor X in Fig. 9). This places across C₀ the voltage $$E_b - i_0R - 1/4\frac{\Delta g}{\Delta e}A^2V^2R + 1/4\frac{\Delta gA^2}{\Delta e}V^2R\left[\frac{r-r_s-r_x}{r}\right] \quad (9)$$

the last term originating from the potentiometer effect of the slide wire, where $r$ is the total resistance of the slide wire 63, $r_s$ is the resistance from the junction with $C_s$ to the fixed contact 64 and $r_x$ is the resistance between the fixed contact 64 and the movable contact 39.

At D, the condenser C₀ has been disconnected by the switch S₅. The condenser C₀ should be a good condenser or the equivalent in order that it will retain its charge without perceptible diminution until it is reconnected to the system in the regular course of the switching operations.

At E, the detector switch S₁ has disconnected the detector from the repeater. This operation replenishes whatever charge the condenser $C_s$ has lost since the operation shown at C to bring it back to the voltage $E_b - i_0R$. The blanking switch S₃ has at this stage shifted its contact to conductor S which is connected to the fixed contact 64 on the slide wire.

At F, the oscillator switch S₂ has impressed the voltage $AV_0$ upon the detector input. The condenser C₀ is still disconnected providing an opportunity for any switching transient to be dissipated in the filter 61 before the condenser is again connected.

At G, the blanking relay S₄ has completed a connection that places across the condenser C₀ the voltage $$E_b - i_0R - 1/4A^2V_0^2R\frac{\Delta g}{\Delta e} + 1/4A^2V_0^2R\frac{\Delta c}{\Delta e}\left[\frac{r-r_s}{r}\right] \quad (10)$$

the last term being the potentiometer effect.

At H, the blanking relay S₅ has disconnected the condenser C₀ from the circuit.

Returning now to A, the detector switch S₁ has removed the input from the detector. The voltage across the condenser $C_s$ is now $E_b - i_0R$, and the blanking switches are connected to the movable contact 39 of the slide wire. From this point on, the sequence of operations repeats itself.

With this arrangement, the voltage across C₀ alternates between the values obtained in conditions C and G, producing a rectangular shaped wave. The difference between the peak values in this wave is readily seen to be $$2v = 1/4\frac{\Delta g}{\Delta e}A^2R\left[\frac{-r_s-r_x}{r}V^2 + \frac{r_s}{r}V_0^2\right] \quad (11)$$

It will be noted that by virtue of the subtraction performed at this point the factor $(E_b - i_0R)$ disappears.

The slide wire is now adjusted to give a null output, that is, to obtain an unvarying potential on the condenser C₀ as detected by the circuit following this condenser. This operation gives $$\frac{V_0}{V} = \sqrt{1 + \frac{r_x}{r_s}} \quad (12)$$

Here, $r_s$ is in reality reduced to a circuit constant, and the slide wire may be adjusted by means of proper shunts in well-known manner so that a linear scale is obtained that will give the reading of the attenuation directly in decibels. It will be noted that by virtue of the null adjustment, the factor $$1/4 \frac{\Delta g}{\Delta e} A^2 R$$

disappears.

As a result of the above-described procedure, the ratio of $V_0$ to $V$ finally depends only on $r_x$ and $r_s$ and is independent of $$E, \frac{\Delta g}{\Delta e}, A, R, \text{ and } i_0$$

To obtain the value of $$\frac{V_0}{V}$$

in decibels with an accuracy of .001 decibel it is then necessary that $r_x$ and $r_s$ be known to an accuracy of 2 per cent and that they have a long time stability of this value.

Each one of the constants involved must be highly stable during the short switching period, e. g., a sixtieth of a second. However, the values of the constants may drift slowly, by as much as the usual vacuum tubes and circuit components are found to drift, without significantly affecting the result of the measurement.

On the right of Fig. 9 are shown illustrative corresponding variations in the voltages respectively impressed upon the repeater and across the condenser $C_0$ as the switching operation proceeds.

The lower power level at which the measurement is made makes it necessary to give special consideration to noise currents. The transconductance $g$ of the detector tube is effective to amplify any noise voltage impressed upon the grid of the tube. For best results the tube must be biased strongly to keep $g$ small but not enough to carry the operation of the tube out of the carabolic range. The 6AK5 tube has been found to give good results for this purpose when operated with a space current of about 1 milliampere. With the resistor R one tenth of a megohm, the gain of the detector is such that .001 decibel corresponds to one millivolt at the plate to be impressed upon the circuits following thereafter. This voltage is so low as to require the use of the most constant available power supplies and for the greatest precision it may be necessary to use batteries. On the grid of the detector tube the corresponding noise level is about 10 microvolts. The grid bias should be obtained from a battery unless a specially stable power supply is otherwise available. Experiment has shown that the heaters of the tubes should all be battery operated. If heterodyning is employed, the heaters and the plate supply for the local oscillators and buffer amplifiers in the heterodyne oscillator should also be operated on batteries for best results.

The switches $S_3$, $S_4$ and $S_5$, that handle the measuring voltage following the detection, while having no impedance or attenuation requirements, do advantageously make use of a shield between the operating winding and the contact leads.

A possible source of error of measurement exists if the harmonics of the measuring voltage are detected in the rectifier. A simple calculation shows that, for an error of one part in ten thousand, the harmonics must be less than one per cent of the fundamental. It is usually easy to meet this requirement both in the oscillator and in the repeater.

A residual error in the detector of about .0005 decibel may be found to originate somewhere in the low frequency part of the circuit. This error is usually independent of frequency and loss and may be cancelled out by means of an electromotive force injected into the potentiometer through a variable resistor in such a way as to facilitate a suitable initial adjustment in well known manner.

Calibration of the circuit may be conveniently made at some relatively low frequency such as 200 kilocycles by use of a suitable attenuation standard built for the purpose. The resistance $r$ may be adjusted until the measuring set reads correctly when used with the standard attenuator. This calibration takes care of second order effects such as the voltage drop across the rectifier 65 which charges the condenser $C_s$ and also residual charges on the condensers and leakages in the condensers.

In a measuring set which has been built it has been possible to determine that the largest error over the range of attenuation and frequency is .0009 decibel when suitable corrections are applied. If no corrections are made, the error is estimated to be .0012 decibel.

It is desirable in many cases that the results of measurement be obtained rapidly and permanently in the form of a pen and ink record of the frequency characteristics. This may conveniently be done by placing the potentiometer circuit $r_s$, $r_x$ $r$ in one of the recorder systems which are commercially available such as the Leeds and Northrup "Speedomax Recorder." The output of the detector is then sent directly into the amplifier which is contained in the recorder. The 60-cycle component of the output thus amplified in the recorder operates the motor in the recorder. It has been found to be unnecessary to filter the harmonics of the 60-cycle wave.

In order to obtain a linear frequency scale and at the same time to reduce the complexity and cost of the oscillator 26, the arrangement shown in Figs. 7 and 8 follows the disclosures in my copending application, Serial No. 195,075, filed November 10, 1950, whereby the paper in the recorder is advanced by the same power system which operates to vary the frequency of the oscillator, and this portion of the system is controlled so as to furnish a linear frequency scale, which scale may be that which is printed on the recording paper which is manufactured for use with the recorder.

The oscillator 26 has its frequency swept over a desired frequency band by the control means 53 which is mechanically actuated by the source 55 which is of nominally constant frequency. The wave from oscillator 26 is sent over the line under test to the recorder as described, which makes a record of the amplitude of the received wave on the ruled paper chart 58, in order to plot the gain or loss-versus-frequency charactertistic of the line. It is only necessary to drive the chart in strict accordance with the rate of change of oscillator 26 to obtain a record of amplitude variation with frequency, plotted to the correct frequency scale. For this purpose the synchronous drive 56 is operated from source 55.

Timing intervals for the switches are to be selected so that an error of operation of .001 second does not adversely affect the accuracy of the measurement.

The vectors in Fig. 10 are shown separated by equal angles of 45 degrees in order to simplify the design of the phasing device. Other equal or unequal angles may be used instead, as uniform spacing of operating times is not essential.

It is to be understood that the above-described arrangements are illustrative of the application of the principles of the invention. Numerous other arrangements may be devised by those skilled in the art without departing from the spirit and scope of the invention.

What is claimed is:

1. In a measuring set, a converter for producing unidirectional current in response to an impressed wave of alternating potential, input and output circuits for the converter, periodic switching means for connecting the input circuit of the converter alternately to first and second transmission circuits to be compared, thereby producing in the output circuit of the converter changes in the amount of unidirectional current constituting a wave of the same periodicity as the switching means and having an amplitude varying in response to the difference in the amplitudes of whatever waves are received in the input circuit of the converter over the respective transmission circuits to be compared, a potentiometer connected to the output circuit of the converter, a fixed contactor and a movable contactor connected to the potentiometer, a sampling circuit, means for connecting the sampling circuit to the fixed contactor of the potentiometer during a portion of each time interval within which the converter is connected to the first of said transmission circuits to be compared and for connecting the sampling circuit to the movable contactor of the potentiometer during a portion of each time interval within which the converter is connected to the second of said transmission circuits, thereby producing potential variations in the sampling circuit with the periodicity of the switching means and of amplitude responsive to the difference between the potential of the fixed contactor when the converter is connected to the first transmission circuit to be compared and the potential of the movable contactor when the converter is connected to the second transmission circuit to be compared, means actuated by the last-mentioned potential variations for changing the position of the movable contactor on the potentiometer whereby said last-mentioned potential variations may be reduced substantially to zero, and means to indicate the relative position of the movable contactor along the potentiometer.

2. In a measuring set, a converter for producing unidirectional current in response to an impressed wave of alternating potential, input and output circuits for the converter, periodic switching means for connecting the input circuit of the converter alternately to first and second transmission circuits to be compared, thereby producing in the output circuit of the converter changes in the amount of unidirectional current constituting a wave of the same periodicity as the switching means and having an amplitude varying in response to the difference in the amplitudes of any high frequency waves that may be received in the input circuit of the converter over the respective transmission circuits to be compared, a potentiometer connected to the output circuit of the converter, a fixed contactor and a movable contactor each contacting the potentiometer, a potential sampling capacitor, means for connecting the said capacitor to the fixed contactor during a portion of each time interval within which the converter is connected to the first of said high frequency transmission circuits and for connecting the capacitor to the movable contactor during a portion of each time interval within which the converter is connected to the second of said high frequency transmission circuits, thereby producing potential variations in the sampling capacitor with the periodicity of the switching means and of amplitude responsive to the difference between the potential of the fixed contactor when the converter is connected to the first transmission circuit to be compared and the potential of the movable contactor when the converter is connected to the second transmission circuit to be compared, means controlled by the last-mentioned potential variations to move the movable contactor with respect to the potentiometer, and means to indicate the relative position of the movable contactor along the potentiometer.

3. In a measuring set, the combination according to claim 1, together with means for automatically recording the movements of the movable contactor.

4. In a measuring set, the combination according to claim 1, in which the movable contactor is connected to the said means actuated by the potential variations in the potentiometer in the requisite sense that the motion of the movable contactor reduces the amplitude of the potential variations in the sampling circuit to substantially zero.

5. In a measuring set, the combination according to claim 1, in which the period of the switching means is short relative to drifting of the operating constants of component parts of the measuring set and long relative to the period of the impressed wave of alternating potential.

6. In a measuring set for comparing a pair of transmission circuits, an oscillator, a converter for producing direct current in response to an impressed alternating potential, input and output circuits for the converter, a potentiometer connected to the output circuit of the converter, a fixed contactor and a movable contactor on the potentiometer, a sampling circuit, a plurality of double-throw switches each having a movable arm and two fixed contacts, the first said switch having its movable arm connected to the oscillator and its fixed contacts connected respectively to one end of each of the transmission circuits to be compared, the second said switch having its movable arm connected to the input circuit of the converter and its fixed contacts connected respectively to the other end of each of the transmission circuits to be compared, the third said switch having its fixed contacts connected respectively to the fixed contactor and the movable contactor of the potentiometer, the movable arms of the third and fourth switches being connected together, the fixed contacts of the fourth switch being connected respectively to the fixed contacts of the fifth switch, and the movable arm of the fifth switch being connected to the sampling circuit, means to throw the said switches successively in the order of first and third substantially simultaneously, followed by second, fourth, and fifth in the order named, starting from an initial condition in which the first and second switches are connected to one and the same transmission circuit and the movable arms of the fourth and fifth switches are connected respectively to unconnected fixed contacts.

7. In a measuring set for comparing a pair of transmission circuits, an oscillator, a converter for producing direct current in response to an impressed alternating potential, input and output circuits for the converter, a potentiometer connected to the output circuit of the converter, a fixed contactor and a movable contactor on the potentiometer, a sampling circuit, a plurality of double-throw switches each having a movable arm and two fixed contacts, the first said switch having its movable arm connected to the oscillator and its fixed contacts connected respectively to one end of each of the transmission circuits to be compared, the second said switch having its movable arm connected to the input circuit of the converter and its fixed contacts connected respectively to the other end of each of the transmission circuits to be compared, the third said switch having its fixed contacts connected respectively to the fixed contactor and the movable contactor of the potentiometer, the movable arms of the third and fourth switches being connected together, the fixed contacts of the fourth switch being connected respectively to the fixed contacts of the fifth switch, and the movable arm of the fifth switch being connected to the sampling circuit, sequential switching means to operate the said first and second switches alternately by changing the movable arm from one fixed contact to the other and similarly to operate the said fourth and fifth switches alternately, the said operations of the fourth and fifth switches occurring in one and the same order during those intervals following the operation of the same one of the first and second switches and before the operation of the other one of the first and second switches, and to operate the said third switch following the operation of the fourth and fifth switches.

8. In a measuring set for comparing first and second transmission circuits, an oscillator, a detector, input and output circuits for the detector, means to connect the oscillator to the input circuit of the detector alternately through one or the other of the transmission circuits to be compared, a cathode follower connected to the output circuit of the detector, a cathode resistor for the cathode follower, a smoothing capacitor and a potentiometer connected serially with each other across the cathode resistor, a unidirectional conductor connected across the potentiometer and poled in the direction to conduct from the cathode of the cathode follower to the common junction of the smoothing capacitor and the potentiometer, a fixed contactor and a movable contactor on the potentiometer, a sampling capacitor having one terminal connected to the common junction of the said cathode resistor and the smoothing capacitor, means for connecting the other terminal of the sampling capacitor to the movable contactor of the potentiometer while the oscillator is connected to the first transmission circuit to be compared and for connecting the said other terminal of the sampling capacitor to the fixed contactor of the potentiometer while the oscillator is connected to the second said transmission circuit to be compared, means for moving the movable contactor along the potentiometer, means to stop the motion of the movable contactor when the potential sampled by the sampling capacitor is substantially the same for both of said connections of the sampling capacitor, and means to indicate the relative position of the movable contactor with respect to the potentiometer.

THADDEUS SLONCZEWSKI.

References Cited in the file of this patent

UNITED STATES PATENTS

| Number | Name | Date |
| --- | --- | --- |
| 2,183,140 | Hochgraf | Dec. 12, 1939 |
| 2,337,540 | Burgess | Dec. 28, 1943 |